US008392469B2

(12) United States Patent  (10) Patent No.: US 8,392,469 B2
Khan et al.  (45) Date of Patent: Mar. 5, 2013

(54) MODEL BASED DISTRIBUTED APPLICATION MANAGEMENT

(75) Inventors: Shafqat Ullah Khan, Lynnwood, WA (US); Nedialko K Paskov, Bellevue, WA (US); David J Armour, Bellevue, WA (US); Michael J Healy, Duvall, WA (US); Prasanna Kumar Jayapal, Bothell, WA (US); Brett D. A. Flegg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/137,511

(22) Filed: Jun. 11, 2008

(65) Prior Publication Data

US 2009/0313266 A1 Dec. 17, 2009

(51) Int. Cl.
*G06F 17/30* (2006.01)
*G06F 7/00* (2006.01)

(52) U.S. Cl. ........................................................ 707/802

(58) Field of Classification Search ................ 717/104, 717/106, 107, 114, 115, 120, 101, 121, 174; 709/203, 220; 707/790, 802, 803, 811
See application file for complete search history.

(56) References Cited

U.S. PATENT DOCUMENTS

| | | | |
|---|---|---|---|
| 6,598,160 B1 * | 7/2003 | Mano | 713/2 |
| 6,618,766 B1 | 9/2003 | Eshghi | |
| 6,701,514 B1 * | 3/2004 | Haswell et al. | 717/115 |
| 6,847,970 B2 | 1/2005 | Kar et al. | |
| 7,430,498 B2 * | 9/2008 | Butterfield et al. | 703/2 |
| 7,779,091 B2 * | 8/2010 | Wilkinson et al. | 709/220 |
| 2003/0028579 A1 | 2/2003 | Kulkarni et al. | |
| 2003/0200296 A1 | 10/2003 | Lindsey | |
| 2004/0015856 A1 | 1/2004 | Goward et al. | |
| 2006/0230314 A1 | 10/2006 | Sanjar et al. | |
| 2006/0259289 A1 | 11/2006 | Shia | |
| 2007/0094381 A1 * | 4/2007 | Weiss et al. | 709/224 |
| 2007/0250338 A1 | 10/2007 | Kumhyr et al. | |
| 2008/0059944 A1 * | 3/2008 | Patterson et al. | 717/104 |
| 2008/0141380 A1 * | 6/2008 | Ikeda et al. | 726/27 |
| 2010/0191624 A1 * | 7/2010 | Sharir et al. | 705/30 |

OTHER PUBLICATIONS

Author: Gerardo Canfora and Aniello Cimitile, Title: Software Maintenance; Published Date: Nov. 29, 2000; pp. 1-33.*
Gervais, et al., "META Group Model Engineering Technics and Applications", retrieved at << http://www-src.lip6.fr/projets/racine/odac-eng.html >>, pp. 3.
Von, et al., "Model-Driven Development of QoSEnabled Distributed Applications", 2004, pp. 231.
Hofstader, "Building Distributed Applications: Using Patterns to Define a Software Solution", Nov. 2006, Microsoft Corporation, pp. 9.
Cao, et al., "Behavior Modeling of Object-Oriented Distributed Systems", IEEE International Conference on Systems, Man, and Cybernetics, 1996, IEEE, pp. 1658-1663.
Rosa, et al., "The Conception of Distributed Application", 20th International Conference on Industrial Electronics, Control and Instrumentation, IECON '94, Vol. 2, IEEE, 1994, pp. 1135-1140.
"Unified Modeling Language", retrieved at << http://en.wikipedia.org/wiki/Unified_Modeling_Language >>, pp. 8.

* cited by examiner

*Primary Examiner* — Usmaan Saeed
*Assistant Examiner* — Md. I Uddin

(57) ABSTRACT

Aspects of the subject matter described herein relate to model based application management. In aspects, models are defined that include structural and behavioral characteristics, rules, relations, and so forth between entities of an application. An instruction regarding a management function is received. The models are used to generate actions that when executed manage the application in accordance with the instruction.

20 Claims, 8 Drawing Sheets

MODEL BASED DISTRIBUTED APPLICATION MANAGEMENT

BACKGROUND

Deploying, configuring, and maintaining applications is a challenging and time consuming task. This task is complicated by distributed applications that may have components distributed across multiple devices.

For example, deploying a distributed application may involve understanding its deployable components as well as the hardware and software requirements for each component. In addition, components of a distributed application may depend on other components of the distributed application in such a way that deploying, troubleshooting, or otherwise managing the application may be difficult. Furthermore, taking applications or components thereof in and out of service may demand a sound understanding of the effects of such actions to avoid problems with other applications and components.

With the ever-increasing complexity and interdependence of software systems, these problems and others related to managing distributed applications will only become more challenging and may go beyond the skills of most information technology (IT) administrators.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to model based application management. In aspects, models are defined that include structural and behavioral characteristics, rules, relations, and so forth between entities of an application. An instruction regarding a management function is received. The models are used to generate actions that when executed manage the application in accordance with the instruction.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise.

Exemplary Operating Environment

Figure 1:
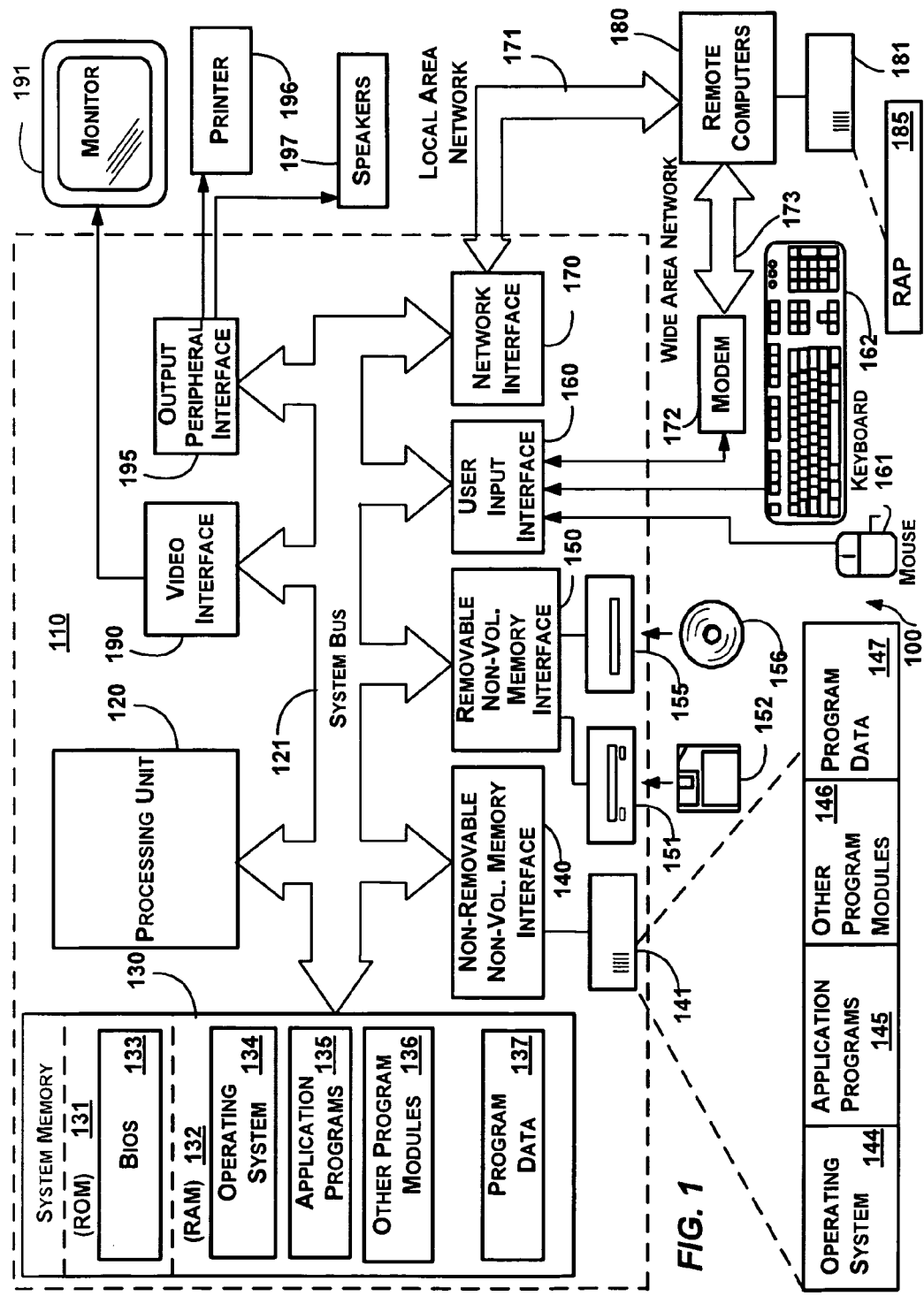
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer includes any electronic device that is capable of performing a computation. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Model Based Management

As mentioned previously, managing applications is a time consuming task that is growing increasingly complex. Aspects of the subject matter described herein relate to a model based approach to managing applications.

Figure 2:
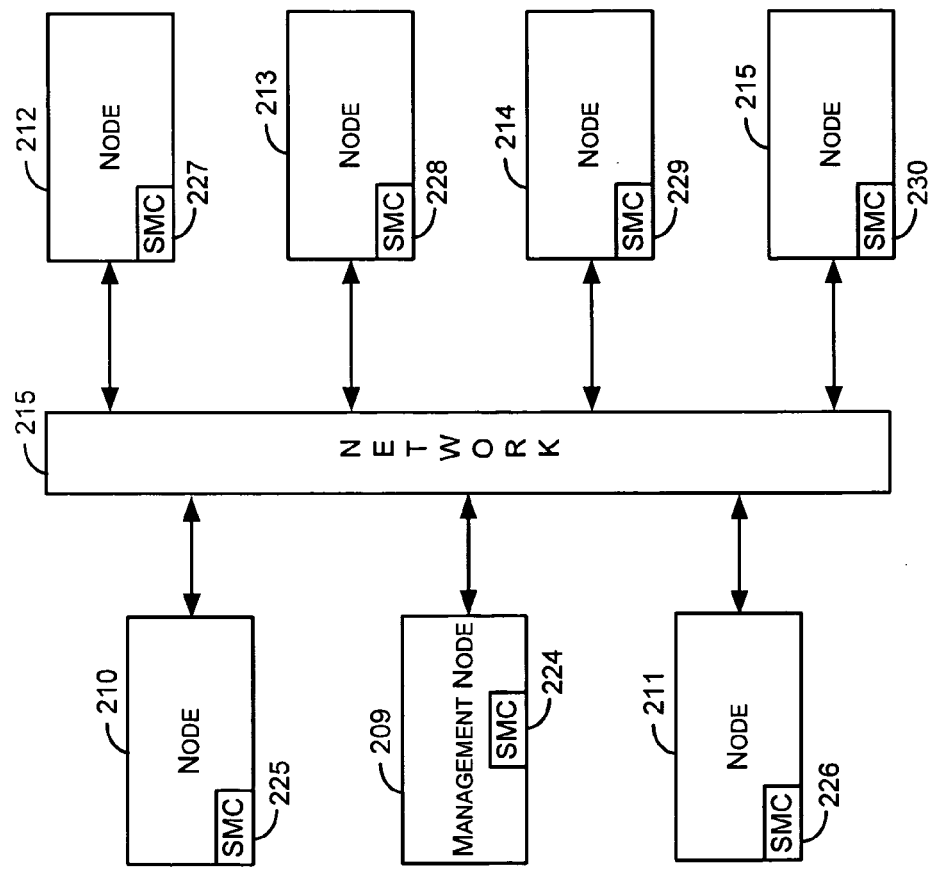
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include various nodes 209-215, a network 215, and may include other entities (not shown). The various entities may be located relatively close to each other or may be distributed across the world. The various entities may communicate with each other via various networks including intra- and inter-office networks and the network 215.

In an embodiment, the network 215 may comprise the Internet. In an embodiment, the network 215 may comprise one or more local area networks, wide area networks, direct connections, virtual connections, private networks, virtual private networks, some combination of the above, and the like.

The nodes 209-215 may be implemented on or as one or more computers (e.g., the computer 110 as described in conjunction with FIG. 1). A node may include or be configured to include one or more software components. Such software components may be part of a distributed application, for example. For example, a mail application may have a component that receives e-mails from the Internet, a component that scans the e-mails for malware, a component that stores the e-mails, a component that provides local access to the e-mails to clients, a component that provides Web access to Web browsers, a component that sends e-mails to external locations, other components, and the like. In some configurations, one or more of these software components may be located on a single node. In other configurations, two or more nodes may coordinate in providing the functions of single component.

The nodes 209-215 may include software management components 224-230, respectively. A software management component may comprise a set of one or more processes, threads, or the like that may install, configure, remove, maintain, determine health, bring in and out of service, determine capacity, perform other software management functions, and the like regarding components of applications associated with the nodes 209-215. The software management component 224 of the management node 209 may determine where software components are to be installed and may coordinate management actions with software management components on the selected nodes. The software management component 224 may provide a user interface by which a system administrator or the like may provide commands and receive output associated with managing software.

Figure 3:
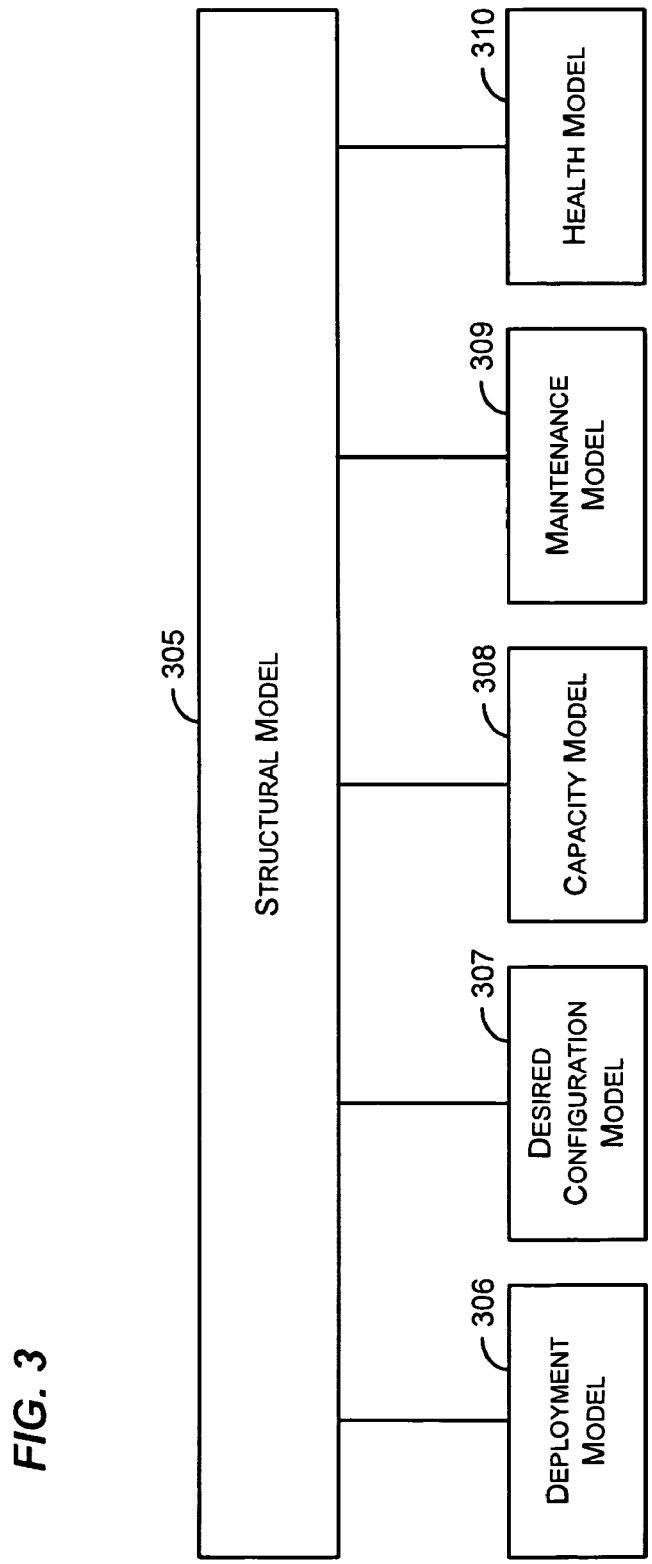
FIG. 3 is a block diagram that generally represents various models that may be used to manage software in accordance with aspects of the subject matter described herein.
Figure 4:
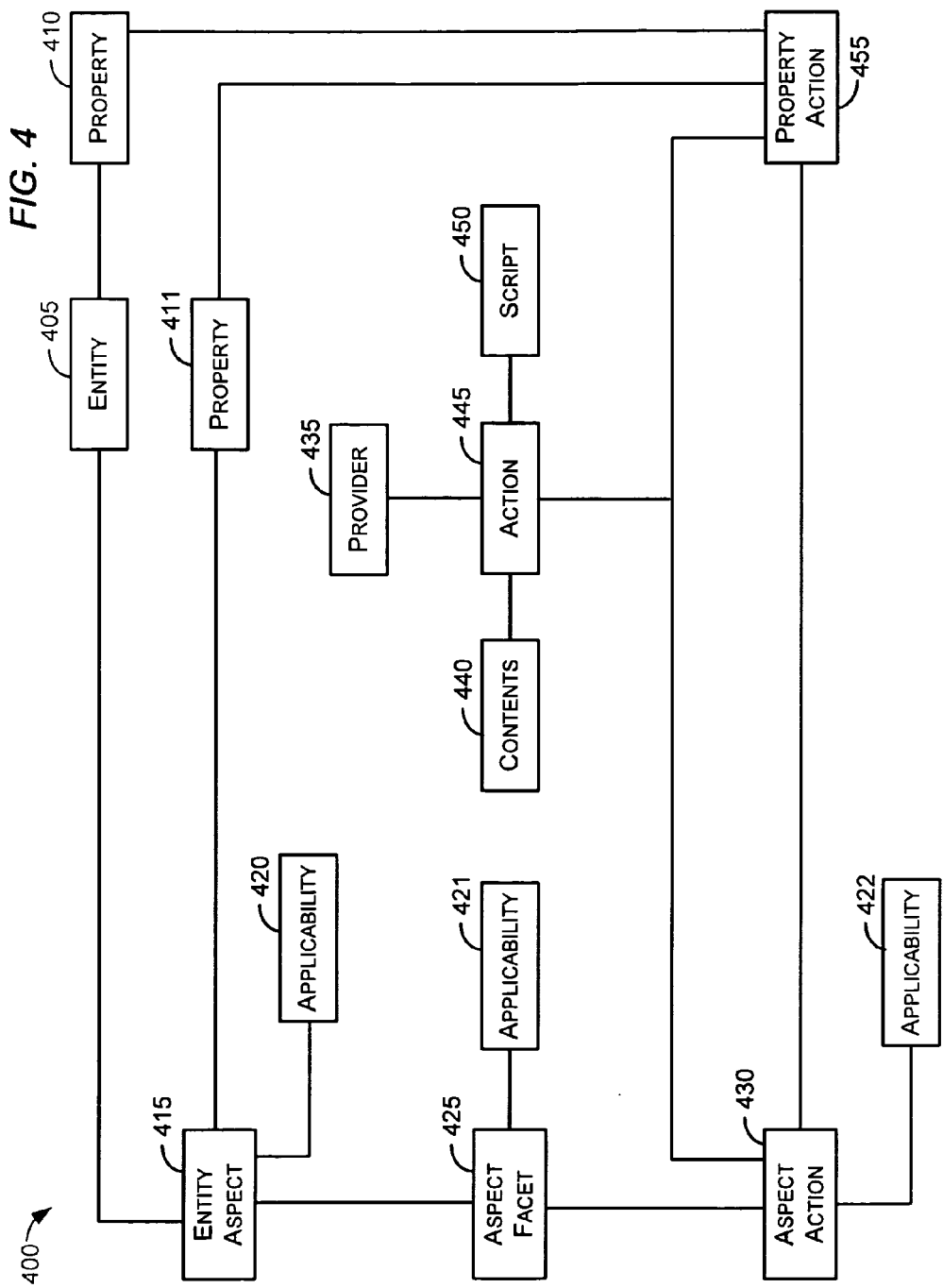
FIG. 4 is a block diagram that generally represents an exemplary schema that may be used to manage software in accordance with aspects of the subject matter described herein.

One or more models as described in conjunction with FIG. 3-4 may be used by a software management component to assist an administrator or the like in managing applications. Using the models, the software management component may present information useful for impact analysis and may be able to detect and identify conflicts of a proposed change. A software management component (e.g., the software management component 224 of the management node 209) may present an administrator or the like with an indication of any actions including alternative actions, if any, that are possible to satisfy various models.

Although the environment described above includes a management node and six other nodes, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

To manage software components, a software management component may utilize one or more models as described in conjunction with FIGS. 3-4.

FIG. 3 is a block diagram that generally represents various models that may be used to manage software in accordance with aspects of the subject matter described herein. A model is representation of how an application exists in the physical world and may also define some behavioral concepts of the application. An application model may be broken down into different aspects so that change in one aspect does not impact other aspects of the application.

Referring to FIG. 3, the structural model 305 provides a base set of characteristics. Other models (e.g., behavioral models 306-310) are tied to the structural model 305 and are not allowed to violate the basic rules defined in the structural model 305. The structural model 305 defines how different components in an application are related to each other. The structural model 305 may also define the interfaces of an application or the roles the application exposes to other applications/services.

The structural model 305 may be defined in the form of entities. An entity may refer to and define relationship/dependencies with other entities. Some exemplary entities include an operating system (OS) (e.g., Windows® Server 2008), an application (e.g., Exchange), an application role (e.g., mail server), and the like. The above list is not intended to be exhaustive or all-inclusive. Indeed, based on the teachings herein, those skilled in the art will recognize many other software components that may be represented as entities.

An entity may include one or more of the following characteristics: containment, derivation, properties, references, and constraints.

Containment: An entity may contain one or more entities. The contained entities may be of the same type (e.g., in the case of cluster) or different types (e.g., in the case of a distributed application).

Derivation: New types may be derived from an entity type. For example, an OperatingSystem type may be derived from Entity type, and in turn a WindowsServer2008 type may be derived from the OperatingSystem type.

Properties: An entity may include two kinds of properties. A first kind of property may identify the entity while a second kind of property may take part in the constraints defined in the entity. Properties may be defined as public or private. Only public properties are involved in an interface.

Reference: An entity may explicitly define references to other entities. This is particularly true for references to entities involved in the entity's constraints.

Constraint: A constraint defines a set of one or more rules and relationships among entities within or across applications. Constraints may include expressions, dependencies, and cardinalities.

Expression: A set of one or more expressions may be used to enforce restrictions. An expression may include one or more values, variables, operators, and functions that are evaluated in accordance with rules of precedence to return a result. An expression may involve various operators including Equal (e.g., "="), Not Equal (e.g., "!="), Range (e.g., values in a certain range), In (e.g., a set operator), Less Than (e.g., "<"), Greater Than (e.g., ">"), AND, OR, other operators, and the like.

Dependency: Any entity may define a dependency on another entity. Four exemplary types of dependencies include:

1. Requires: A requires relationship indicates a restriction that the entity defining the requires relationship cannot work without the referenced entity.

2. Uses: A uses relationship is a non assertive form of "Requires." For example, a uses relationship indicates that an entity may use another entity if it is available; otherwise, the entity may operate without the other entity.

3. Conflicts: A conflicts relationship is the opposite of a requires relationship. When an entity defines a conflicts relationship, this indicates that the entity cannot coexist with the referenced entity on a single machine.

4. Prohibits: A prohibits relationship places a restriction on the referenced entity but not on the entity that includes the prohibits relationship. For example, an operating system may prohibit an application, but the operating system may still work if the operating system is upgraded on a machine that contains the application.

The above list of dependencies is not intended to be all-inclusive or exhaustive. Based on the teachings herein, those skilled in the art may recognize other dependencies that may be defined without departing from the spirit or scope of aspects of the subject matter described herein.

Cardinality: Cardinality indicates a number of entities may exist with the context of the referenced entity. For example, Cardinality(WebTierHost)=1 . . . 4 indicates a cardinality of 1 to 4 may exist in the context of the referenced entity.

Behavioral models capture dynamic behavior of an application. Some examples of behavioral models include:

1. Deployment Model 306: A deployment model defines settings to discover where an entity is applicable, deployed, and whether the entity needs to be installed on a given target. A deployment model may define how to deploy an entity based on a given applicable target (e.g., a host machine).

2. Desired Configuration Model 307: A desired configuration model may be considered as a superset of the deployment model described above. A desired configuration model may also define settings and behaviors to keep an entity in a specified state. For example, an entity of an application may get manually reconfigured or become corrupted. The desired configuration model may be used to restore the entity to a particular state.

3. Capacity Model 308: A capacity model may include a matrix that defines what number and types of application roles are needed for a particular environment. An application role is well-defined functionality of a distributed application. For example, an e-mail application may include a web access role, a mail server role, and other roles.

4. Maintenance Model 309: A maintenance model may define how to get an entity of an application in and out of service. This may involve actions that need to be taken with the entity and other entities to ensure seamless operation.

5. Health Model 310: A health model may be used to capture health monitoring rules and variables used in those rules.

FIG. 4 is a block diagram that generally represents an exemplary schema that may be used to manage software in accordance with aspects of the subject matter described herein. The schema may include an entity type 405, property types 410-411, an entity aspect type 415, applicability types 420-422, an aspect facet type 425, an aspect action type 430, a provider type 435, a contents type 440, an action type 445, a script type 450, and a property action type 455.

An entity (e.g., of type entity 405) may include zero or more properties. Each entity in the structural model has zero or more entity aspects (e.g., of type entity aspect 415) associated with it depending upon the needed behavioral aspects for a given entity. Entity aspect is derived from entity and may have properties, references, and constraints. In most cases, an entity aspect will not have its own properties and will refer to the properties defined in the entity itself. Entity aspect may be of different types depending on the behavioral model. For example, an entity aspect may be of a deployment, desired configuration, capacity, maintenance, or health type. An entity aspect may include zero or more applicability conditions (e.g., of applicability type 420). Applicability conditions are a set of one or more constraints on properties of an entity or referenced entity.

An aspect facet (e.g., of aspect facet type 425) includes a collection of actions needed to execute a given aspect of an entity. An aspect facet will normally include one or more applicability conditions (e.g., of application type 421). For example, an applicability condition may define an architecture and OS level details applicability conditions associated with it. In this example, the applicability conditions define architecture and OS level details. For example, the set of action described in an aspect facet may be applicable to Windows® or Linux systems, 32 bit vs. 64 bit, and so forth.

An action (e.g., of action type 445) may include a script (e.g., of script type 450) and contents (e.g., of contents type 440) associated with the script. The script may be passed to a referenced provider (e.g., of provider type 435). Some examples of actions include:

1. An installer and its corresponding command line may be passed to MSI provider/handler which may be an execution engine on a client.

2. The script may comprise a PowerShell script handled by a PowerShell engine.

3. The script may include update information that is passed to an update agent.

4. The script may include raw command line which gets extended by running through Property Set(ers) and a text manipulator provider.

5. The script may include a multi-step automation routine such as a task sequence or a workflow.

An action may include one or more applicability conditions. Based on these condition(s), some actions may be applicable while others are not. For example if a source and target value of a property is the same, its setter is not applicable.

A property action (e.g., of type property action type 455) may derive from an action. There are two types of property actions, namely Get and Set. Get defines the way to get property value (e.g., via registry, WMI provider, custom actions, and the like), while set defines the way to set a property value.

An entity aspect may include one or more aspect actions (e.g., of aspect action type 430). An aspect action may derive from an action. Some examples of an aspect action include discovery, configuration, entering maintenance, exiting maintenance, some other aspect action, and the like. An aspect action may be associated with zero or more applicability conditions (e.g., of type applicability 422) as well as zero or more property actions.

Below is an XML snippet that defines some elements of an exemplary model in accordance with aspects of the subject matter described herein.

```xml
<?xml version="1.0" encoding="utf-8" ?>
<applicationModel dslVersion="1.0.0.0" Id="a62d1337"
   xmlns="http://some.namespace.com/ApplicationModelLanguage">
<entity>
<serviceRole Id="30d75867" name="MP Cluster">
   <subEntities>
      <serviceRoleMoniker Id="3dadb96e" />
   </subEntities>
</serviceRole>
<serviceRole Id="3dadb96e" name="Management Point">
   <targetEntityBases>
      <entityBaseReferencesTargetEntityBases>
         <resourceMoniker Id="d698380c" />
      </entityBaseReferencesTargetEntityBases>
      <entityBaseReferencesTargetEntityBases>
         <serviceMoniker Id="080bc00f" />
      </entityBaseReferencesTargetEntityBases>
      <entityBaseReferencesTargetEntityBases>
         <serviceRoleMoniker Id="5bfbace0 " />
      </entityBaseReferencesTargetEntityBases>
   </targetEntityBases>
<constraints>
   <constraint name="BITS" expression="OS.BITS=Enabled" />
   <constraint name="IIS" expression="OS.Role.IIS=Enabled" />
   <constraint name="Version" expression="OS.Version>=5.2" />
   <constraint name="OSType" expression="OS.Type=Server" />
   <constraint name="SP" expression="OS.SP=SP1" />
   <constraint name="ReqDB" expression="Requires(SCCM DB)" />
   <constraint name="ReqMachine" expression="Requires(MP Hardware)" />
</constraints>
<entityProperties>
   <entityProperty validationConstraint="Length(SiteCode)=3" name="SiteCode"
      propertyType="String" />
   <entityProperty validationConstraint="!=empty" name="UserName"
      propertyType="String" />
<entityProperty validationConstraint="!=empty" name="Password"
      propertyType="String" />
</entityProperties>
</serviceRole>
<resource Id="d698380c" name="MP Hardware">
   <targetEntityBases>
      <entityBaseReferencesTargetEntityBases>
         <serviceMoniker Id="080bc00f" />
      </entityBaseReferencesTargetEntityBases>
   </targetEntityBases>
   <entityProperties>
      <entityProperty validationConstraint="!=empty" name="Netbios Name"
         propertyType="String" />
      <entityProperty name="FQDN" propertyType="String" />
   </entityProperties>
</resource>
<service Id="080bc00f" name="OS" description="Operating System">
   <entityProperties>
      <entityProperty validationConstraint=">0" name="Version" propertyType="Float" />
      <entityProperty validationConstraint="in(Server,Client)" name="Type"
         propertyType="String" />
      <entityProperty validationConstraint="in(IIS,NPS...)" name="Role"
         propertyType="Boolean Array" />
      <entityProperty validationConstraint="!=empty" name="SP" propertyType="String"/>
      <entityProperty name="BITS" propertyType="Boolean" />
   </entityProperties>
</service>
<serviceRole Id="5bfbace0" name="SCCM DB">
   <targetEntityBases>
      <entityBaseReferencesTargetEntityBases>
         <serviceMoniker Id="f3ab0266" />
      </entityBaseReferencesTargetEntityBases>
      <entityBaseReferencesTargetEntityBases>
         <resourceMoniker Id="749b49b6" />
      </entityBaseReferencesTargetEntityBases>
   </targetEntityBases>
   <constraints>
```

-continued

```
      <constraint name="SQLVersion" expression="SQL.Version>=2005" />
      <constraint name="SP" expression="SQL.SP=SP2" />
      <constraint name="ReqMachine" expression="Requires(DBMachine)" />
    </constraints>
<entityProperties>
    <entityProperty validationConstraint="!=Empty" name="DB Name"
        propertyType="String" />
    <entityProperty validationConstraint="!=Empty" name="DB Instance"
        propertyType="String" />
    <entityProperty validationConstraint="!=Empty" name="UserName"
        propertyType="String" />
    <entityProperty validationConstraint="!=Empty" name="Password"
        propertyType="String" />
    <entityProperty name="IsReplicated" propertyType="Boolean" />
    <entityProperty name="IsCaseSensitive" propertyType="Boolean" />
</entityProperties>
<derivedEntites>
    <serviceRoleMoniker Id="be36bc9a" />
    <serviceRoleMoniker Id="c1da5699" />
</derivedEntites>
</serviceRole>
<serviceRole Id="be36bc9a" name="Main DB" />
<serviceRole Id="c1da5699" name="Replicated DB" />
    <service Id="f3ab0266 " name="SQL" description="SQL Server">
<targetEntityBases>
    <entityBaseReferencesTargetEntityBases>
        <serviceMoniker Id="080bc00f" />
    </entityBaseReferencesTargetEntityBases>
    </targetEntityBases>
    <constraints>
        <constraint name="OS Version" expression="OS.Version>=5.2" />
        <constraint name="OSType" expression="OS.Type=Server" />
    </constraints>
<entityProperties>
    <entityProperty validationConstraint=">0" name="Version" propertyType="Integer"/>
    <entityProperty name="SP" propertyType="String" />
</entityProperties>
</service>
<resource Id="749b49b6 " name="DBMachine">
    <targetEntityBases>
        <entityBaseReferencesTargetEntityBases>
            <serviceMoniker Id="080bc00f" />
        </entityBaseReferencesTargetEntityBases>
    </targetEntityBases>
    <entityProperties>
        <entityProperty validationConstraint="!=empty" name="NetBios Name"
            propertyType="String" />
        <entityProperty name="FQDN" propertyType="String" />
    </entityProperties>
</resource>
</entity>
</applicationModel>
```

Below is another XML snippet that defines some elements of another exemplary model in accordance with aspects of the subject matter described herein.

```
<?xml version="1.0" encoding="utf-8" ?>
<applicationModel Version="1.0.0.0" Id="f398147f"
    xmlns="http://some.namespece.com/ ApplicationModelLanguage">
<entity>
    <entity Id="43913fe3 " name="SCCM Tools">
    <entityAspects>
        <entityAspect Id="d1d7a0e9" name="Deployment">
    <aspectFacets>
        <aspectFacet Id="4e322864" name="Vista">
        <aspectActions>
            <aspectAction Id="f668aa41" name="Discover" providerType="CmdShell">
        <contenting>
            <content name="DiscoverContentPath" contentPath="\\server\path1" />
        </contenting>
        <scripts>
            <script name="DiscoverScript" scriptPath="cscript.exe
                %DiscoverContentPath%\discover.vbs" />
        </scripts>
```

```
            <provider>
                <providerMoniker Id="98821e6d" />
            </provider>
            <applicabilities>
                <applicability name="DiscoverConstraint" applicabilityRule="Rediscover ==
                    true" />
            </applicabilities>
            <propertyActions>
                <propertyAction Id="2d0e88e0 " name="Installed"
                        providerType="PropertySetter" propertyValue="true">
                    <applicabilities>
                    <applicability name="Discovered"
                            applicabilityRule="Discover.DiscoverScript.ExitCode == 1" />
                    </applicabilities>
                    <entityAspectProperty>
                        <entityAspectPropertyMoniker Id="b63366ec" />
                    </entityAspectProperty>
                </propertyAction>
                <propertyAction Id="b8ec641f" name="NotInstalled"
                    providerType="PropertySetter" propertyValue="false">
                    <applicabilities>
                        <applicability name="NotDiscovered"
                        applicabilityRule="Discover.DiscoverScript.ExitCode == 0" />
                    </applicabilities>
                <entityAspectProperty>
                    <entityAspectPropertyMoniker Id="b63366ec" />
                </entityAspectProperty>
                </propertyAction>
                <propertyAction Id="2657d04d" name="SetRediscoverFalse"
                    providerType="PropertySetter" propertyValue="false">
                    <entityAspectProperty>
                        <entityAspectPropertyMoniker Id="4c5149d6" />
                    </entityAspectProperty>
                </propertyAction>
                <propertyAction Id="f4ecb286" name="SetVersion"
                        providerType="PropertySetter" propertyValue="4.0">
                    <applicabilities>
                        <applicability name="Discovered1"
                            applicabilityRule="Discover.DiscoverScript.ExitCode == 1" />
                    </applicabilities>
                    <entityAspectProperty>
                        <entityAspectPropertyMoniker Id="3b4d9728" />
                    </entityAspectProperty>
                </propertyAction>
            </propertyActions>
        </aspectAction>
        <aspectAction Id="ab9f4061" name="Install" providerType="CmdShell">
            <contenting>
                <content name="InstallPath" contentPath="\\server\path2" />
            </contenting>
            <scripts>
                <script name="InstallScript" scriptPath="%InstallPath%ccmtools.msi" />
            </scripts>
            <provider>
                <providerMoniker Id="98821e6d" />
            </provider>
            <applicabilities>
                <applicability name="InstallConstraint" applicabilityRule="IsInstalled == false"/>
            </applicabilities>
            <propertyActions>
                <propertyAction Id="ae79670e" name="SetInstalled"
                    providerType="PropertySetter" propertyValue="true">
                <entityAspectProperty>
                    <entityAspectPropertyMoniker Id="b63366ec " />
                </entityAspectProperty>
                </propertyAction>
                <propertyAction Id="7429b351" name="SetRediscover"
                    providerType="PropertySetter" propertyValue="true">
                    <entityAspectProperty>
                        <entityAspectPropertyMoniker Id="4c5149d6" />
                    </entityAspectProperty>
                </propertyAction>
            </propertyActions>
        </aspectAction>
    </aspectActions>
</aspectFacet>
</aspectFacets>
<entityAspectProperties>
    <entityAspectProperty Id="b63366ec " initialValue="unknown" name="IsInstalled"/>
    <entityAspectProperty Id="4c5149d6 " initialValue="true" name="Rediscover" />
```

```
    <entityAspectProperty Id="3b4d9728 " name="Version" />
  </entityAspectProperties>
</entityAspect>
<entityAspect Id="44612cc3" name="Maintenance" />
</entityAspects>
</entity>
</entity>
<providers>
  <provider Id="98821e6d" name="Provider1" type="CmdShell" />
</providers>
</applicationModel>
```

The models indicated by the XML snippets above are exemplary and are not intended to be all-inclusive or exhaustive. Furthermore, the form of the definition of the model is not limited to XML. Indeed, any language capable of expressing the information above may be used without departing from the spirit or scope of aspects of the subject matter described herein.

Figure 5:
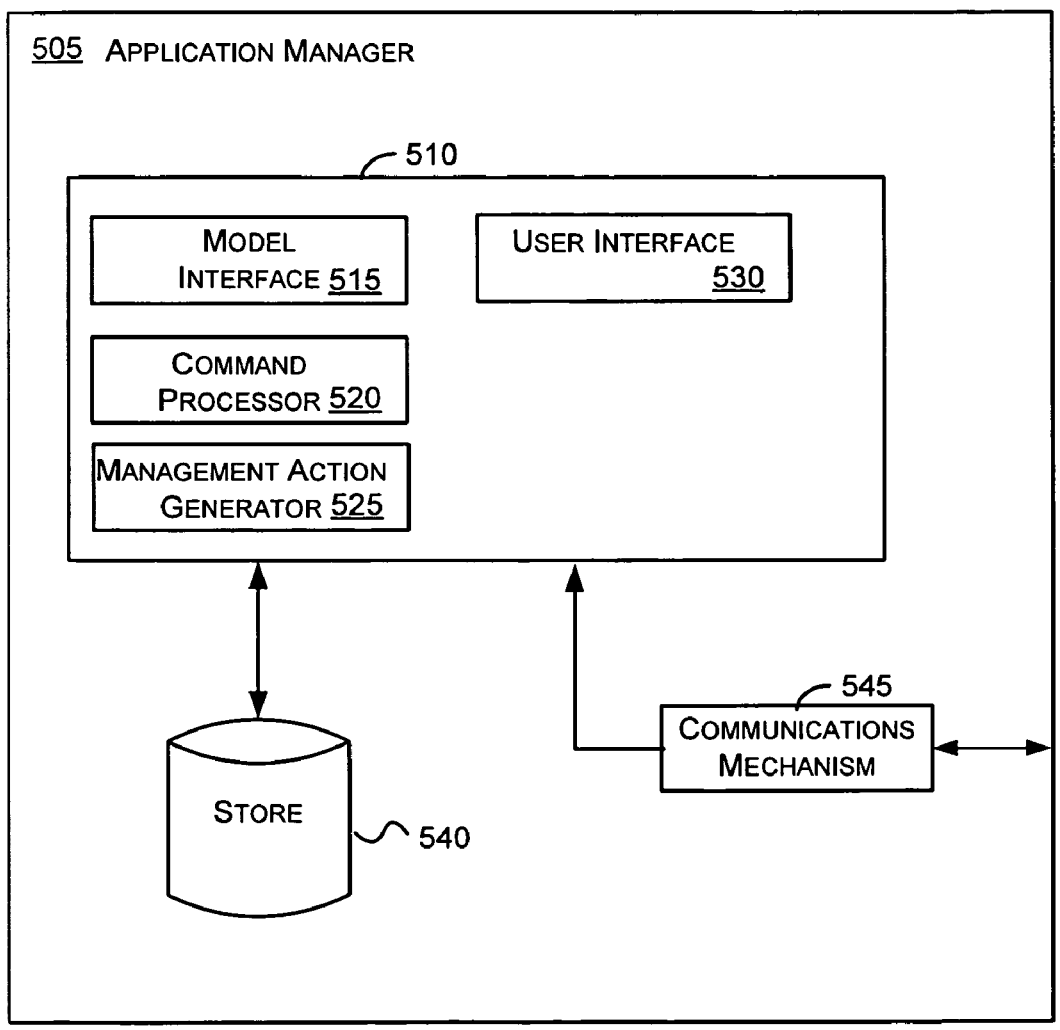
FIG. 5 is a block diagram that represents components of an exemplary system configured in accordance with aspects of the subject matter described herein.

FIG. 5 is a block diagram that represents components of an exemplary system configured in accordance with aspects of the subject matter described herein. The components illustrated in FIG. 5 are exemplary and are not meant to be all-inclusive of components that may be needed or included. In other embodiments, the components and/or functions described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices (e.g., the devices illustrated in FIG. 2).

Turning to FIG. 5, the application manager 505 may include software management components 510, a store 540, and a communications mechanism 545. The software management components 510 may include a model interface 515, a command processor 520, a management action generator 525, and a user interface 530.

The communications mechanism 545 allows apparatus(es) upon which the application manager 505 is hosted to communicate with each other and other entities shown in FIG. 2. The communications mechanism 545 may be a network interface or adapter 170, modem 172, or any other mechanism for establishing communications as described in conjunction with FIG. 1.

The store 540 is any storage media capable of storing model information which may include both structural and behavior models and associated data. The store 540 may comprise a file system, database, volatile memory such as RAM, other storage, some combination of the above, and the like and may be distributed across multiple devices. The store 540 may be external, internal, or include components that are both internal and external to the apparatus(es) hosting the application manager 505.

The model interface 515 may comprise one or more processes, threads, or the like that are responsible obtaining, loading, storing, and providing access to models. These models may be stored on the store 540, received via the user interface 530, and/or received via the communications mechanism 545. The model interface 515 may parse a model and provide an interface by which elements of the model may be accessed by other components.

The command processor 520 may receive instructions regarding managing an application. Managing an application may include installing, removal, configuration, maintaining settings, fixing corruption, determining health, bringing in and out of service, determining capacity, other management functions, and the like. The command processor 520 may work in conjunction with the management action generator to generate actions that when executed manage the application according to the instruction. These actions may include invoking code, calling APIs, scanning a registry or other database, or any other actions that a computer can take.

The user interface 530 may be used to provide instructions to the command processor 520 as well as to receive reports and other data regarding state and management of one or more applications.

Figure 6:
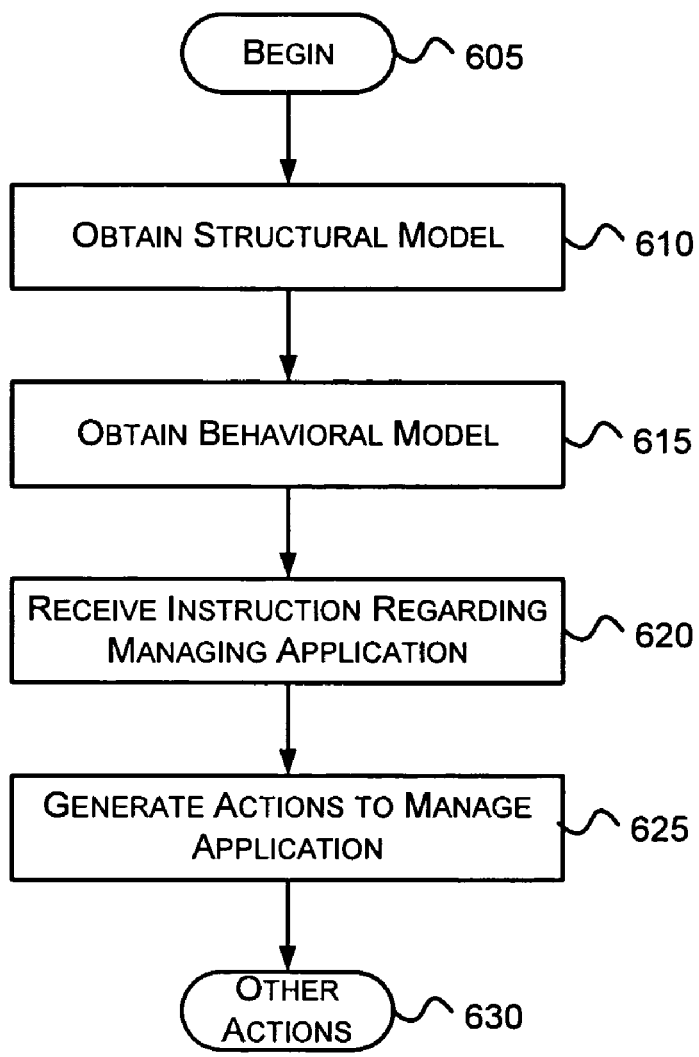
FIG. 6 is a flow diagram that generally represents exemplary actions that may occur in managing an application in accordance with aspects of the subject matter described herein.
Figure 7:
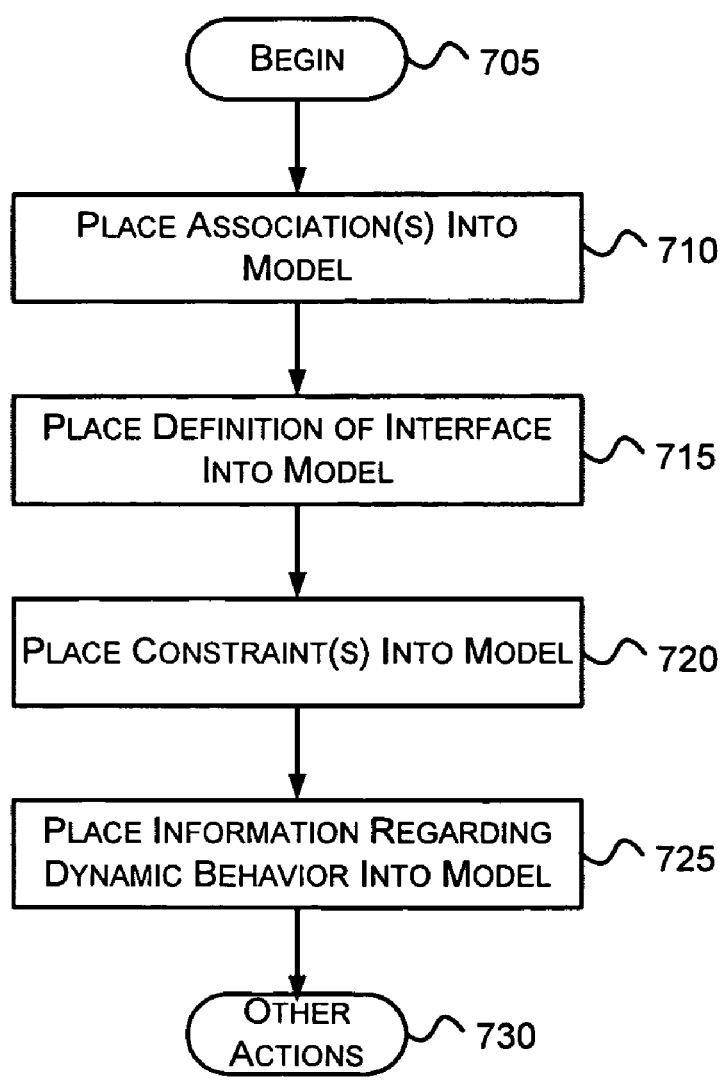
FIG. 7 is a flow diagram that generally represents exemplary actions that may occur to populating a model in accordance with aspects of the subject matter described herein.
Figure 8:
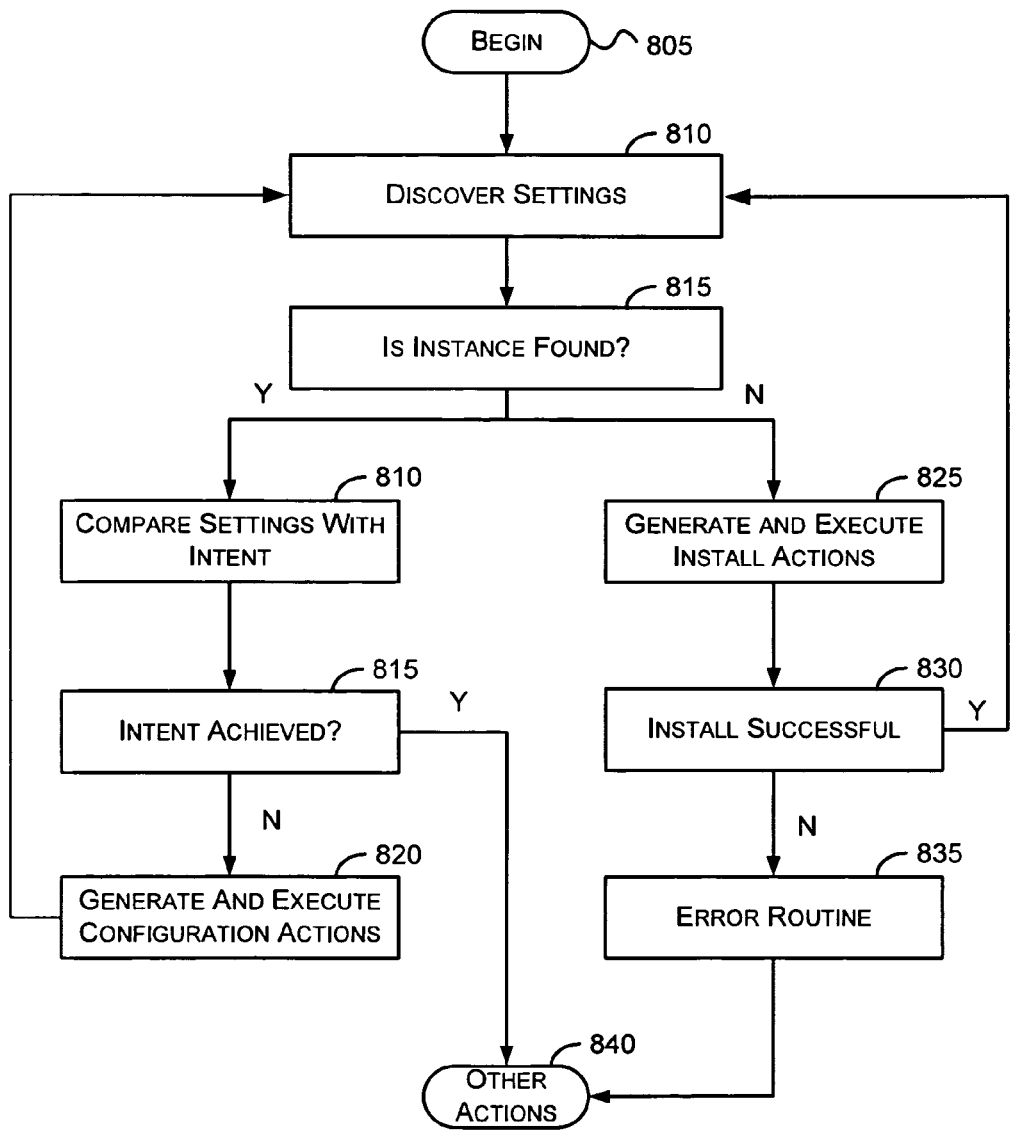
FIG. 8 is a flow diagram that generally represents exemplary actions that may occur in installing and configuring an application according to desired configuration settings in accordance with aspects of the subject matter described herein.

FIGS. 6-8 are flow diagrams that generally represent actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents exemplary actions that may occur in managing an application in accordance with aspects of the subject matter described herein. At block 605, the actions begin.

At block 610, a structural model is obtained. For example, referring to FIGS. 4 and 5, a model interface 515 may load a first data structure from the store 540. This data structure may be structured according to a schema as discussed in conjunction with FIG. 4.

At block 615, a behavioral model is obtained. As indicated previously, a behavioral model may include dynamic characteristics of the application. Furthermore, the structural and behavioral models may be obtained from the same data structure or from different data structures.

At block 620, an instruction regarding managing the application is received. For example, referring to FIG. 5, the command processor 520 may receive an instruction from the user interface 530 regarding management of an application. For example, the instruction may be to deploy the application using certain parameters indicated in a model. As another example, the instruction may be to begin using the model(s) to maintain the configuration of an existing application.

At block 625, actions are generated to manage the application in accordance with the instruction. For example, referring to FIG. 525, the management action generator 525 may generate actions that can be executed natively by one or more computers, interpreted by one or more components of the computer, a combination of native and interpreted execution, and the like.

At block 630, other actions, if any, may occur.

FIG. 7 is a flow diagram that generally represents exemplary actions that may occur to populating a model in accordance with aspects of the subject matter described herein. Note that the order of actions indicated in conjunction with FIG. 7 is merely exemplary and that the actions associated with any particular block may be repeated more than one time and/or repeated after actions associated with any other block. Turning to FIG. 7, at block 705, the actions begin.

At block 710, one or more associations are placed into the model. For example, referring to FIG. 5, a graphical user interface may be presented by the user interface 530 to allow a user to associate two entities of an application. This association may then be stored in the store 540 via the model interface 515

At block 715, a definition of an interface is placed into the model. For example, referring to FIG. 5, the user interface 530 may receive a definition of a public interface exposed by an application. This definition may then be stored in the store 540 via the model interface 515.

At block 720, constraints are placed into the model. For example, referring to FIG. 5, the user interface 530 may receive one or more constraints associated with an application. These constraints may then be stored in the store 540 via the model interface 515.

At block 725, information regarding dynamic behavior is placed into the model. For example, referring to FIG. 5, the user interface 530 may receive dynamic behavior associated with an application and may store this dynamic behavior in the store 540 using the model interface 515.

At block 730, other actions, if any, may occur.

FIG. 8 is a flow diagram that generally represents exemplary actions that may occur in installing and configuring an application according to desired configuration settings in accordance with aspects of the subject matter described herein. Generating actions may occur after an application instance is defined (based on its models) and resources, including machines, have been assigned.

A process (e.g., the management action generator 525 of FIG. 5) may generate a set of actions using the behavioral models in the form of a work flow actions orchestrated across multiple machines. Based on the information in models and administrator intent, actions may be generated for any management operation as described previously.

Turning to FIG. 8, at block 850, the actions begin.

At block 810, after receiving an instruction to configure an application, settings regarding the application may be discovered. Only discover actions that are applicable based on applicability conditions defined in the behavioral model are applied.

At block 815, if an instance is found, the actions continue at block 810; otherwise, the actions continue at block 825. Having an instance of the application found indicates that the application is currently installed. If no instance is found, then the application is not currently installed and needs to be installed before configuration can occur.

At block 810, settings of the application are compared with desired configuration in a desired configuration model. If admin intent is achieved based on the comparison, the actions continue at block 840; otherwise, the actions continue at block 820.

At block 820, configuration actions are generated (e.g., via the management action generator 525 of FIG. 5). These actions are then executed.

At block 825, when the instance is not found, actions to install the application are generated and executed.

At block 830, if the install was successful, the actions continue at block 810; otherwise, the actions continue at block 835.

At block 835, error routines are executed. The error routines may indicate errors that occurred during the installation and configuration, for example.

At block 840, other actions, if any, are performed.

Note that the actions described in conjunction with FIG. 8 are exemplary only and relate to configuration and installation. Other actions related to other behavioral models may be performed in a similar manner.

As can be seen from the foregoing detailed description, aspects have been described related to model based distributed application management. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

obtaining a first data structure that includes a structural model, the structural model including a definition of an interface of an application, the interface being exposed to entities outside of the application, the structural model further including relationships between different entities of the application, the relationships including a dependency indicating that a first entity and a second entity are not allowed to coexist on a single machine, the structural model containing rules that other models, including a behavioral model, that are associated with the structural model are not allowed to violate;

obtaining a second data structure that includes the behavioral model, the behavioral model indicating dynamic characteristics of the application and including a plurality of models, the plurality of models including a deployment model, a desired configuration model, a capacity model, a maintenance model, and a health model, each of the plurality of models being different from others of the plurality of models such that a change in the respective model does not impact the others of the plurality of models, the structural model and the behavioral model being accessible via a model interface that is operable to parse the structural model and the behavioral model to enable access to elements of the structural model and the behavioral model;

receiving an instruction regarding managing the application, the instruction regarding at least one operation, the at least one operation including at least one of installing the application, removing the application, configuring the application, maintaining settings of the application, fixing corruption of the application, determining health of the application, bringing the application in and out of service, or determining a capacity of the application; and using the structural model and one or more other models, which are selected from the plurality of models based on the at least one operation, to generate actions that when executed manage the application in accordance with the instruction, the actions including applicability conditions and a script that is passed to a referenced provider and contents associated with the script, the script comprising at least one of update information that is passed to an update agent, a raw command line that is extended via a text manipulator provider, or a multi-step automation routine.

2. The method of claim 1, wherein the structural model includes a property that indicates a constraint associated with an entity of the structural model.

3. The method of claim 2, wherein the constraint includes at least one of an expression or a cardinality.

4. The method of claim 1, wherein the relationships include another dependency indicating that a specified entity of the structural model will not operate properly without another specified entity of the structural model.

5. The method of claim 1, wherein the relationships include another dependency indicating that a third entity uses a fourth entity if the fourth entity is available, but that the third entity is operable without the fourth entity.

6. The method of claim 1, wherein the behavioral model includes information usable to keep an entity of the application in a specified state.

7. The method of claim 1, wherein the behavioral model includes information that indicates a number and type of application roles for a particular environment in which the application is deployed.

8. The method of claim 1, wherein the behavioral model indicates actions to get an entity of the application in and out of service.

9. The method of claim 1, wherein the behavioral model includes information to capture health information regarding the application.

10. The method of claim 1, wherein the first and second data structures are part of a third data structure.

11. The method of claim 1, wherein the behavioral model includes information usable to deploy an entity of the application.

12. A computer memory storage device having computer-executable instructions, which when executed perform actions, comprising:

in accordance with a schema that defines one or more models, including a structural model that includes (1) a definition of an interface of an application, the interface being exposed to entities outside of the application, (2) relationships between different entities of the application, the relationships including a dependency indicating that a first entity and a second entity are not allowed to coexist on a single machine, and (3) constraints that a behavioral model is not allowed to violate, the constraints corresponding to one or more components of a plurality of components of the application, populating one or more data structures structured according to the schema by performing actions, comprising:

placing an association that associates a first and a second entity of an application into at least one of the one or more data structures;

placing a definition of an interface of the application within at least one of the one or more data structures;

placing the constraints within at least one of the one or more data structure; and storing information regarding dynamic behavior of the application within at least one of the one or more data structures, the dynamic behavior of the application corresponding to the behavioral model of the one or more models, the behavioral model including a plurality of models including a deployment model, a desired configuration model, a capacity model, a maintenance model, and a health model, each of the plurality of models being different from others of the plurality of models such that a change in the respective model does not impact the others of the plurality of models, the one or more models usable to generate actions that manage the application which is configured to have the plurality of components distributable across multiple machines, the actions including applicability conditions and a script that is passed to a referenced provider and contents associated with the script, the script comprising at least one of update information that is passed to an update agent, a raw command line that is extended via a text manipulator provider, or a multi-step automation routine, the one or more models being accessible via a model interface that is operable to parse the one or more models to enable access to elements of the of one or more models.

13. The computer memory storage device of claim 12, wherein the structural model defines public interfaces of the application, roles that the application exposes, and properties that define the application.

14. The computer memory storage device of claim 12, wherein the constraints include at least one of an expression or a cardinality.

15. The computer memory storage device of claim 14, wherein the expression includes at least one of a value, a variable, an operator, or a function that is evaluated in accordance with rules of precedence to return a result.

16. The computer memory storage device of claim 14, wherein cardinality indicates a number of entities that are allowed to exist with the context of a referenced entity.

17. In a computing environment, a system comprising:

a store operable to store a structural model that includes a definition of an interface on an application, the interface being exposed to entities outside of the application, the structural model further including relationships between different entities of the application and a behavioral model that includes dynamic characteristics of the application, the relationships including a dependency indicating that a first entity and a second entity are not allowed to coexist on a single machine, the behavioral model including a plurality of models including a deployment model, a desired configuration model, a capacity model, a maintenance model, and a health model, each of the plurality of models being different from others of the plurality of models such that a change in the respective model does not impact the others of the plurality of models, the structural model containing rules that other models, including the behavioral model, that are associated with the structural model are not allowed to violate; and at least one processor operable to parse the structural model and the behavioral model to provide access to elements of the structural model and the behavioral model, the at least one processor further operable to receive an instruction regarding managing the application, the instruction regarding at least one operation, the at least one operation including at least one of installing the application, removing the application, configuring the application, maintaining settings of the application, fixing corruption of the application, determining health of the application, bringing the application in and out of service, or determining a capacity of the application, and the at least one processor further operable to use the structural model and one or more of other models, which are selected from the plurality of models based on the at least one operation to provide actions that when executed manage the application according to the instruction, the actions including applicability conditions and a script that is passed to a referenced provider and contents associated with the script, the script comprising at least one of update information that is passed to an update agent, a raw command line that is extended via a text manipulator provider, or a multi-step automation routine.

18. The system of claim 17, wherein the structural model includes a property that indicates a constraint associated with an entity of the structural model.

19. The system of claim 18, wherein the constraint includes at least one of an expression or a cardinality.

20. The system of claim 18, wherein the expression includes at least one of a value, a variable, an operator, or a function that is evaluated in accordance with rules of precedence to return a result.

* * * * *